United States Patent [19]
Cannon

[11] 3,950,139
[45] Apr. 13, 1976

[54] CATALYTIC CONVERTER HAVING CATALYST RESERVOIR MEANS

[75] Inventor: Earl R. Cannon, Troy, Mich.

[73] Assignee: General Motors Corporation, Detroit, Mich.

[22] Filed: Aug. 23, 1974

[21] Appl. No.: 500,330

[52] U.S. Cl. ............ 23/288 F; 23/288 R; 60/295; 60/299
[51] Int. Cl.² ..... B01J 8/02; F01N 3/15; F01N 7/00
[58] Field of Search ...... 23/288 F, 288 FA, 288 FB, 23/288 B, 288 G, 288 R; 60/295, 299

[56] References Cited
UNITED STATES PATENTS

| | | |
|---|---|---|
| 1,682,787 | 9/1928 | Jaeger .............................. 23/288 R |
| 2,363,738 | 11/1944 | Mather et al. ..................... 23/288 R |
| 3,560,167 | 2/1971 | Bruckner et al. ................. 23/288 R |
| 3,620,685 | 11/1971 | Rogers et al. ..................... 23/288 R |
| 3,649,215 | 3/1972 | Perga et al. ....................... 23/288 F |

Primary Examiner—Barry S. Richman
Assistant Examiner—Bradley R. Garris
Attorney, Agent, or Firm—C. K. Veenstra

[57] ABSTRACT

In an internal combustion engine exhaust system, a catalytic converter mounted on the exhaust manifold has a cylindrical catalyst bed which is disposed on a substantially vertical axis. The exhaust gases flow downwardly into and through a louvered inner tube and then radially through the bed. A frusto-conical baffle is supported from the inner tube and extends outwardly and downwardly into the bed to separate an upper catalyst reservoir portion of the bed from a lower gas flow portion of the bed. During thermal expansion of the bed or upon attrition of the catalyst in the gas flow portion, catalyst beads are discharged from the reservoir portion around the conical baffle and into the gas flow portion.

2 Claims, 12 Drawing Figures

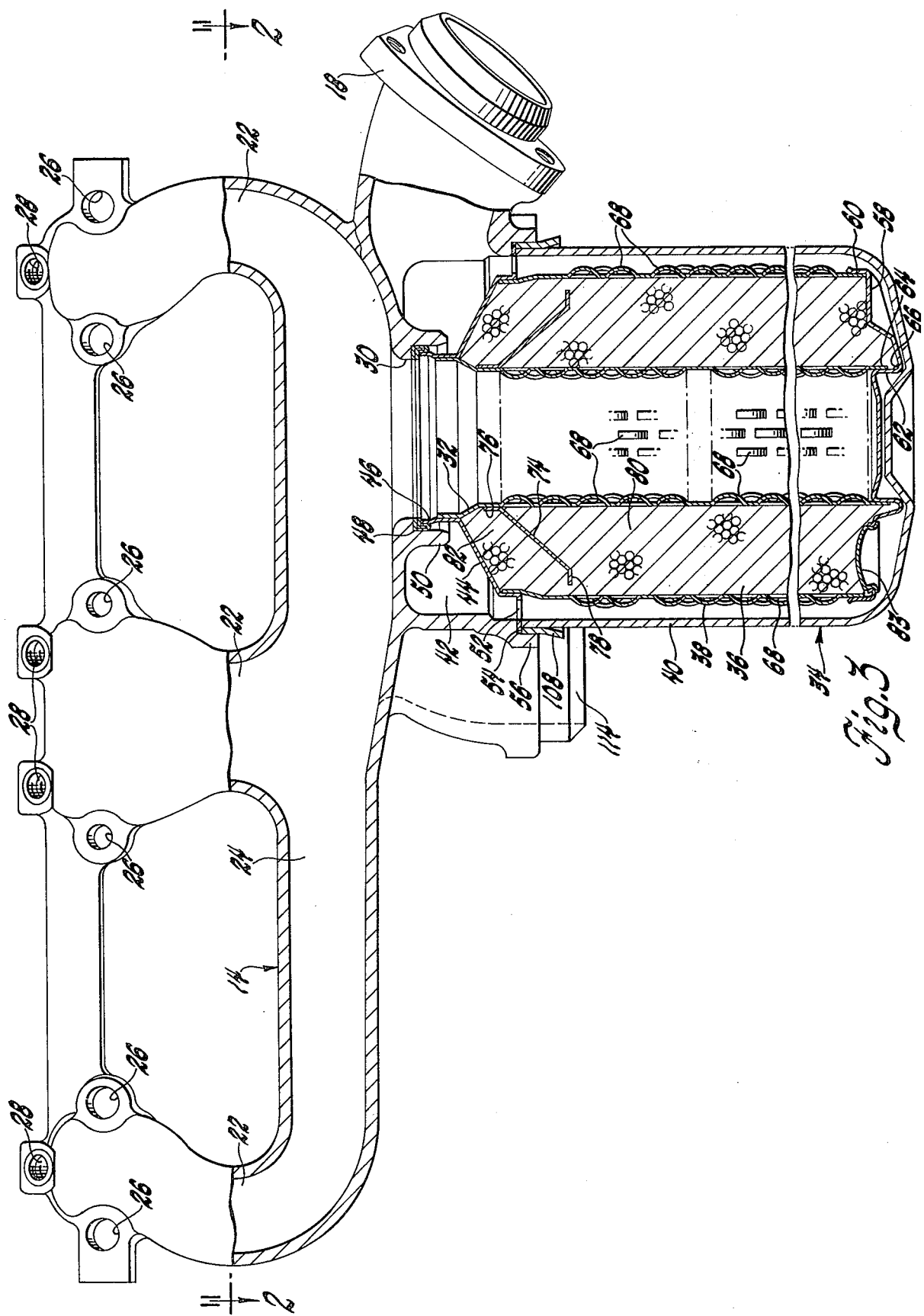

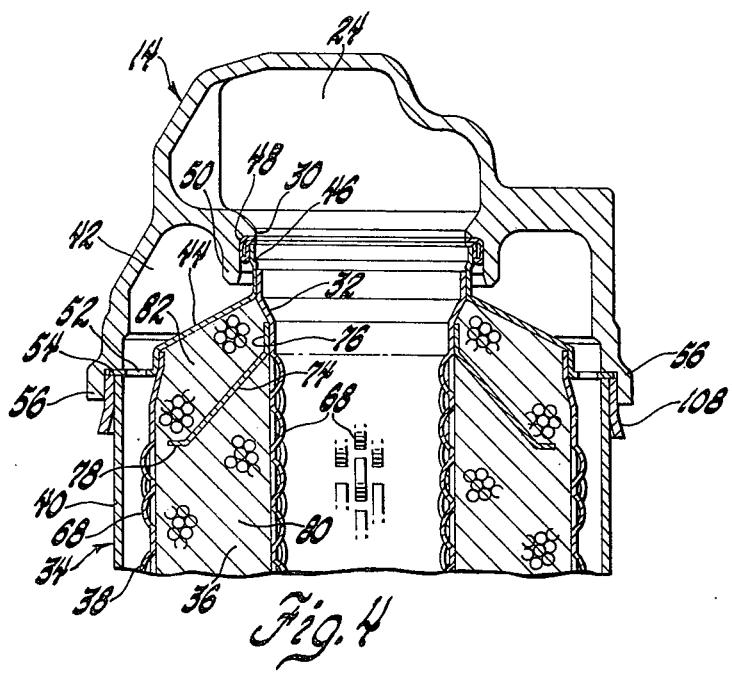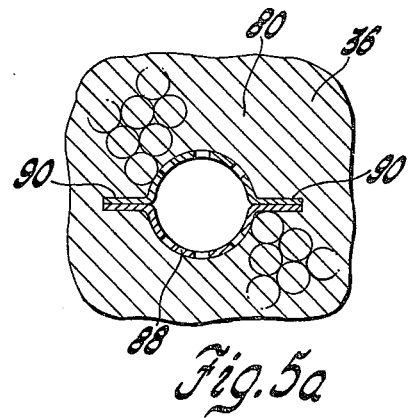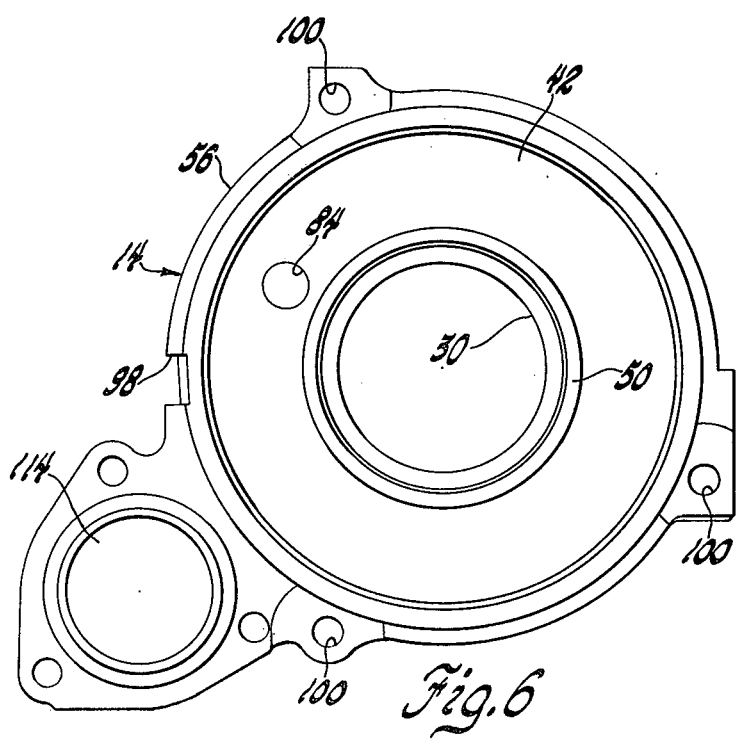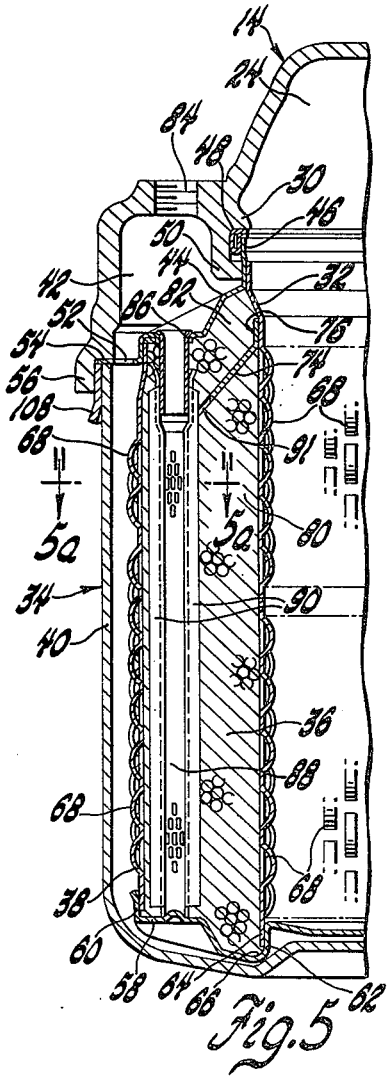

CATALYTIC CONVERTER HAVING CATALYST RESERVOIR MEANS

This invention relates to a catalytic converter for internal combustion engine exhaust gases and more particularly to such a converter having a bead or pellet type catalyst bed with separate reservoir and gas flow portions.

The catalytic converter has been proposed as a means of lowering emission of undesirable exhaust gas constituents from internal combustion engines. Among such converters are those which may be disposed in the exhaust system very close to the engine and have a cylindrical catalyst bed disposed about a vertical axis. In these converters, it has been suggested that the lower portion of the bed form a gas flow portion and that the upper portion of the bed form a reservoir portion from which catalyst beads may be supplied to the gaseous flow portion during thermal expansion of the catalyst bed or upon attrition of the catalyst in the bed.

In one such proposal, no divider was provided between the reservoir and gas flow portions. However, that construction failed to adequately restrain the catalyst beads against movement during operation. The catalyst beads must be restrained against motion to prevent attrition of the beads, and that construction accordingly has been deemed unsuitable.

In another such proposal, a flat plate was disposed horizontally between the reservoir portion and the gas flow portion, and several openings were provided through the plate to permit passage of the beads from the reservoir portion into the gas flow portion. However, that construction has been deemed unsuitable since it cannot adequately restrain bead motion in the gas flow portion without also inhibiting proper movement of catalyst beads from the reservoir portion into the gas flow portion.

This invention provides a catalytic converter having a cylindrical catalyst bed disposed about a vertical axis and in which an upper reservoir portion is separated from a lower gas flow portion by a frusto-conical reservoir plate. The reservoir plate is secured at its inner edge to the inner tube of the catalyst bed and extends downwardly and outwardly therefrom. The outer edge of the reservoir plate is spaced from the outer tube of the catalyst bed to allow catalyst beads to pass thereabout. In one successful embodiment, the outer edge of the reservoir plate is spaced from the outer tube of the catalyst bed a distance of about three times the diameter of the catalyst beads. The exhaust gases flow downwardly into the inner tube and then radially outwardly through the bed. This construction successfully inhibits motion of the catalyst beads within the gas flow portion of the bed while at the same time providing a reservoir portion from which beads may be discharged as required into the gas flow portion.

The details as well as other features and advantages of this invention are set forth in the remainder of the specification and are shown in the drawings in which:

FIG. 3 is a side elevational view of the left exhaust manifold and the converter, further enlarged and having parts broken away to show certain details of the manifold and converter;

FIG. 4 is a sectional view along line 4—4 of FIG. 2 showing additional details of the manifold;

FIG. 5 is a sectional view along line 5—5 of FIG. 2 showing a provision for mounting a thermocouple to sense the catalyst bed temperature;

FIG. 5a is a sectional view along line 5a—5a of FIG. 5 showing details of a thermocouple shield;

FIG. 6 is a bottom plan view of the FIG. 2 manifold, the converter having been removed, enlarged to show details of the converter mounting provisions;

Figure 1:
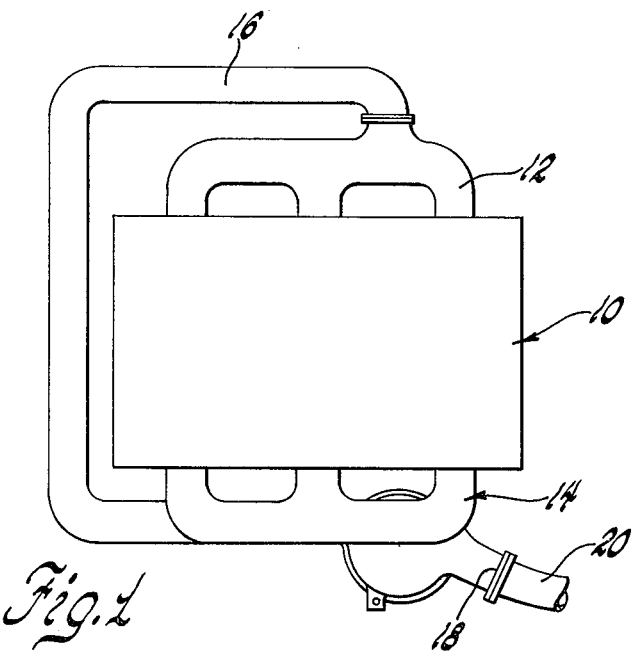
FIG. 1 is a schematic plan view of an engine having this converter mounted on the left exhaust manifold.

Referring first to FIG. 1, a V-type internal combustion engine 10 has a right-hand exhaust manifold 12 receiving exhaust gases from one bank of combustion chambers (not shown) and a left-hand exhaust manifold 14 receiving exhaust gases from the other bank of combustion chambers (not shown). Right-hand manifold 12 discharges exhaust gases through a crossover pipe 16 into left-hand manifold 14. Left-hand manifold 14 has an outlet fitting 18 from which exhaust gases are discharged to an exhaust pipe 20.

Figure 2:
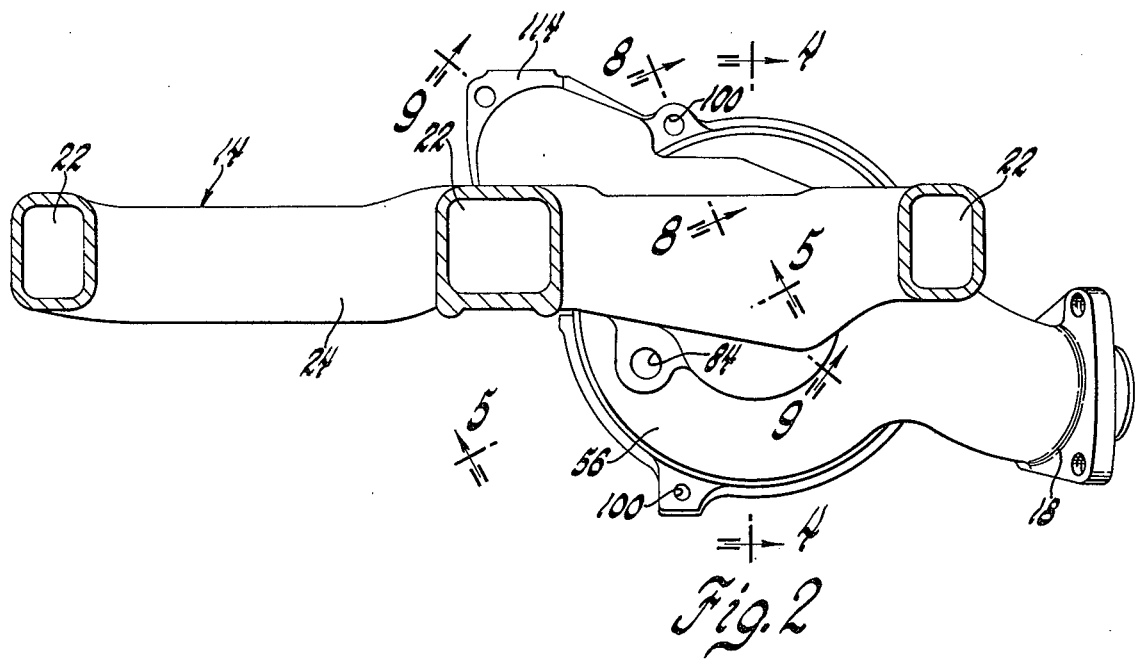
FIG. 2 is an enlarged plan view of the left exhaust manifold from the FIG. 1 engine, taken along line 2—2 of FIG. 3, showing certain details provided to receive this converter.
Figure 7:
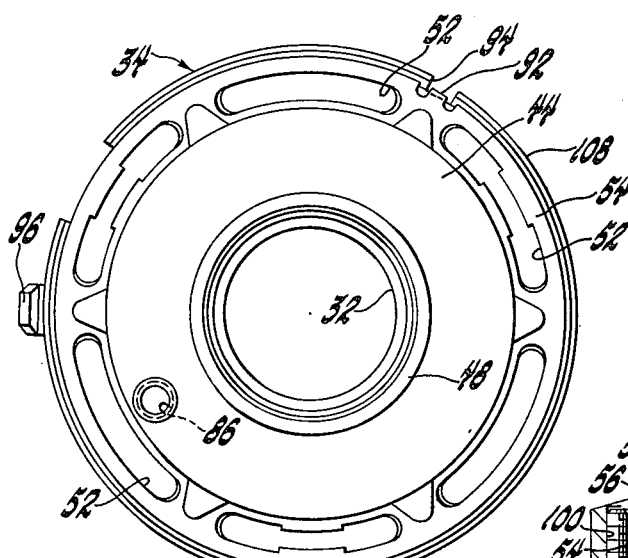
FIG. 7 is a top plan view of the converter removed from the manifold.

As shown in FIGS. 2 and 3, manifold 14 has a plurality of legs 22 which lead from the engine combustion chambers to an exhaust plenum 24. Each leg 22 has a pair of openings 26 adapted to receive studs which secure the manifold to the engine. In addition, legs 22 have openings 28 in which tubes may be received to deliver air to the exhaust gases as they are discharged from the combustion chambers.

As shown in FIGS. 3–5, 8 and 9, plenum 24 has a bottom opening 30 through which exhaust gases are delivered to the inner tube 32 of a catalytic converter 34. The exhaust gases flow downwardly into tube 32, radially through the catalyst bed 36, upwardly through the space between the outer tube 38 and the shell 40, and then into an annular plenum 42 from which they are discharged through outlet fitting 18.

In converter 34, the upper ends of inner and outer tubes 32 and 38 are welded to an upper plate 44. The upper and inner edge 46 of plate 44 carries a seal 48 to prevent flow of exhaust gases between edge 46 and the neck 50 defining opening 30.

The outer rim of upper plate 44 has a plurality of apertures 52, and its peripheral edge 54 is secured between the upper end of shell 40 and an annular skirt 56 formed on the under side of manifold 14.

A lower plate 58 is welded about its outer rim 60 to the lower end of outer tube 38 and has an inner tubular portion 62 in sliding engagement with the lower end of inner tube 32. Plate 58 is spaced from the lower end of shell 40 to permit axial thermal expansion of outer tube 38. The lower end 64 of inner tube 32 is spaced from the bottom 66 of tubular portion 62 to permit axial thermal expansion of inner tube 32 relative to outer tube 38.

Figure 10:
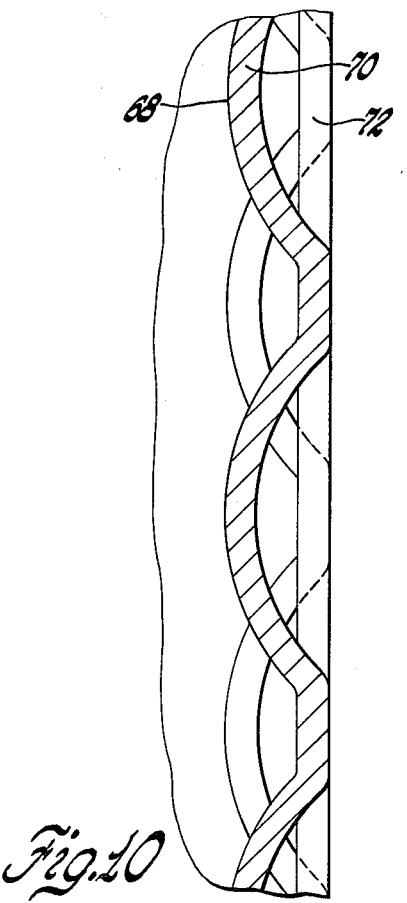
FIG. 10 is a greatly enlarged view of the louvers provided in the inner and outer tubes of the catalyst bed.

Inner tube 32 has two groups of louvers 68 extending entirely about the inside thereof while outer tube 38 has two groups of identical louvers 68 extending entirely about the outside thereof. The louvers on inner tube 32 are inwardly directed while the louvers on outer tube 38 are outwardly directed. It will be noted that the louvers are arranged in vertical rows with the louvers in each row axially offset with respect to the louvers in the rows on either side. As shown in enlarged detail in FIG. 10, louvers 68 are formed by semicircular arcs 70 displaced from the tube blank 72. In a typical installation, inner tube 32 might have about 208 louvers formed in its approximately 8.73 inch length by 2.25 inch diameter while outer tube 38 might have about 358 louvers in its approximately 7.2 inch length by 5.385 inch diameter. Each louver would be about 0.15 inch wide and would be separated from the adjacent row of louvers about 0.15 inch. The louver centers would be axially spaced about 0.7 inch apart in each row, and the centers of the louvers in one row would be axially displaced from the centers of the louvers in the adjacent row about 0.35 inch. Each louver would have an internal radius of about 0.35 inch and an internal height of about 0.065 inch.

Referring again to FIGS. 3–5, 8 and 9, a frusto-conical reservoir plate 74 is welded about its inner edge 76 to inner tube 32 just above the uppermost louvers 68. Reservoir plate 74 extends downwardly and outwardly to a horizontally disposed rim 78. Rim 78 is spaced inwardly from outer tube 38 a distance of about 0.385 inch or about three times the approximately 0.125 inch diameter of the beads forming bed 36 and is disposed just above the uppermost louvers 68 in outer tube 38. Reservoir plate 74 separates catalyst bed 36 into a lower gas flow portion 80 therebelow and an upper reservoir portion 82 thereabove.

During operation, increasing temperatures within converter 34 will cause expansion of inner and outer tubes 32 and 38 at a rate greater than that of the catalyst beads in bed 36. As tubes 32 and 38 expand, additional beads are permitted to flow from reservoir portion 82 into gas flow portion 80. The additional beads in gas flow portion 80 inhibit bouncing of the beads in the exhaust gas stream and thus reduce losses of beads due to attrition. Of course, if the volume of beads within bed 36 is reduced due to attrition, additional beads are permitted to flow from reservoir portion 82 into gas flow portion 80, thereby inhibiting further losses. As the converter 34 cools after operation, beads will be displaced from gas flow portion 80 around reservoir plate 74 back into reservoir portion 82.

As shown in FIG. 3, a plug 83 is removably mounted in lower plate 58 to permit removal and replacement of the catalyst beads in bed 36.

As shown in FIGS. 2 and 5–7, an opening 84 through the skirt 56 provided on manifold 14 and an opening 86 in the upper plate 44 of converter 34 permit insertion of a thermocouple (not shown) into catalyst bed 36 to measure converter bed temperature. A shield 88, having a pair of radially directed flanges 90 (see FIG. 5a), protects the thermocouple from direct, mechanical contact with the catalyst beads. Reservoir plate 74 has a slot 91 to receive shield 88.

A tab 92 is formed on upper plate 44 and received in a notch 94 formed in shell 40 to properly align upper plate 44 in shell 40, and a tab 96 is secured to shell 40 and received in a notch 98 formed in manifold skirt 56 to properly align shell 40 with manifold 14. This construction permits proper alignment of opening 84 in manifold skirt 56 and opening 86 in converter upper plate 44 for insertion of the thermocouple.

Figure 8:
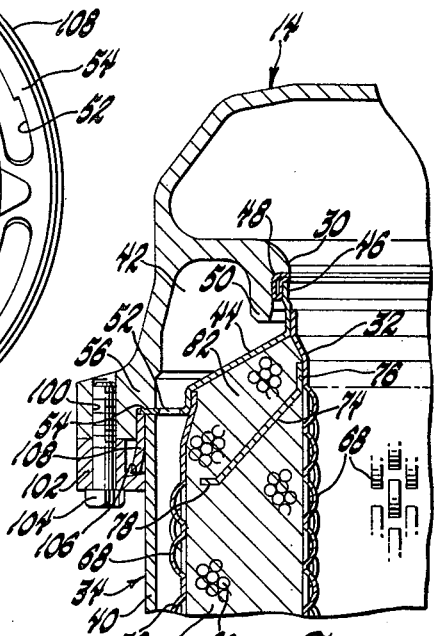
FIG. 8 is a sectional view along line 8—8 of FIG. 2 showing details of the construction by which the converter is secured to the manifold.

As shown in FIGS. 2, 6 and 8, manifold skirt 56 has three tapped holes 100. Retainers 102, shown in FIG. 8, are secured to manifold skirt 56 by studs 104 received in holes 100. Each retainer 102 has a reversely beveled surface 106 which engages under a retaining ring 108 welded about shell 40. This construction efficiently secures converter 34 to manifold 14. It will be appreciated, however, that other mounting provisions may be used without departing from the basic construction of converter 34. If desired, a seal may be secured between shell 40 and skirt 56.

Figure 11:
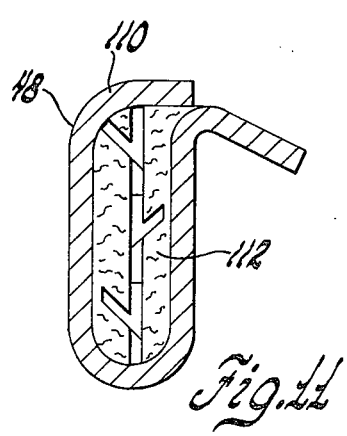
FIG. 11 is a greatly enlarged view of the seal disposed between the converter and the manifold.

One form of seal 48 is shown in FIG. 11. This seal is available from the McCord Corporation and basically comprises an outer wrap 110 of stainless steel disposed about an inner core 112 of pressed metal fibers having low compressibility.

Figure 9:
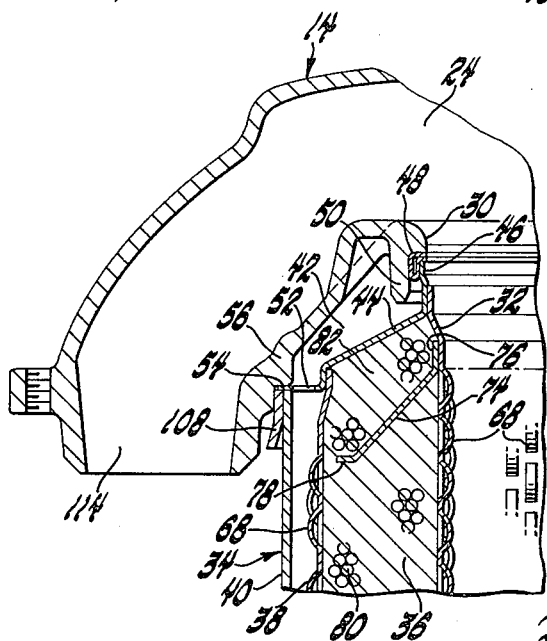
FIG. 9 is a sectional view along line 9—9 of FIG. 2 illustrating the manifold fitting for receiving exhaust gases from the right exhaust manifold through a crossover pipe.

As shown in FIG. 9, an inlet fitting 114 connects cross-over pipe 16 to plenum 24, thereby permitting exhaust gases from both the left and right banks of engine 10 to pass through converter 34.

It will be appreciated, of course, that converter 34 may be used with appropriate catalyst either to promote oxidation of unburned hydrocarbons and carbon monoxide, to promote reduction of oxides of nitrogen, or to promote these or other reactions simultaneously.

The embodiments of the invention in which an exclusive property or privilege is claimed are defined as follows:

1. A catalytic converter for use in an internal combustion engine exhaust system, said catalytic converter comprising a vertically disposed inner tube having an upper end for receiving exhaust gases, an outer tube disposed about said inner tube and defining a catalyst bed therebetween, said inner and outer tubes having louvers formed therein permitting flow of exhaust gases substantially radially outwardly through said catalyst bed, said catalyst bed containing a plurality of catalyst beads adapted to promote an oxidizing or reducing reaction within said exhaust gases, and a substantially frusto-conical reservoir plate secured to said inner tube and extending radially outwardly and downwardly from a location thereon above said louvers therein, said reservoir plate having an outer rim spaced inwardly from said outer tube and located above the louvers of said outer tube, said reservoir plate thereby separating said bed into a reservoir portion thereabove and a gaseous flow portion therebelow and providing a restricted annular opening from said reservoir portion into said gaseous flow portion through which said beads may enter and leave said gaseous flow portion during thermal expansion and contraction of said catalytic converter.

2. A catalytic converter for use in an internal combustion engine exhaust system, said catalytic converter comprising a vertically disposed inner tube having an upper end for receiving exhaust gases, an outer tube disposed about said inner tube and defining a catalyst bed therebetween, said inner and outer tubes having louvers formed therein permitting flow of exhaust gases substantially radially outwardly through said catalyst bed, said catalyst bed containing a plurality of catalyst beads adapted to promote an oxidizing or reducing reaction within said exhaust gases, and an imperforate substantially frusto-conical reservoir plate secured to said inner tube and extending radially outwardly and downwardly from a location thereon above said louvers therein, said reservoir plate having an outer rim spaced inwardly from said outer tube, said reservoir plate thereby separating said bed into a reservoir portion thereabove and a gaseous flow portion therebelow and providing a restricted annular opening from said reservoir portion into said gaseous flow portion through which said beads may enter and leave said gaseous flow portion during thermal expansion and contraction of said catalytic converter.

* * * * *